(12) United States Patent
Ohara et al.

(10) Patent No.: US 11,849,431 B2
(45) Date of Patent: Dec. 19, 2023

(54) USER APPARATUS

(71) Applicant: NTT DOCOMO, INC., Tokyo (JP)

(72) Inventors: Tomoya Ohara, Tokyo (JP); Ryosuke Osawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 309 days.

(21) Appl. No.: 17/275,776

(22) PCT Filed: Sep. 27, 2018

(86) PCT No.: PCT/JP2018/036151
§ 371 (c)(1),
(2) Date: Mar. 12, 2021

(87) PCT Pub. No.: WO2020/065896
PCT Pub. Date: Apr. 2, 2020

(65) Prior Publication Data
US 2022/0046605 A1 Feb. 10, 2022

(51) Int. Cl.
*H04W 72/04* (2023.01)
*H04L 5/14* (2006.01)
*H04W 88/02* (2009.01)
*H04W 8/00* (2009.01)

(52) U.S. Cl.
CPC ............. *H04W 72/04* (2013.01); *H04L 5/14* (2013.01); *H04W 8/005* (2013.01); *H04W 88/02* (2013.01)

(58) Field of Classification Search
CPC ..... H04W 72/04; H04W 72/23; H04W 8/005; H04W 88/02; H04L 5/14
See application file for complete search history.

(56) References Cited

U.S. PATENT DOCUMENTS

| 10,111,191 | B2* | 10/2018 | Bagheri | H04W 76/14 |
| 10,721,697 | B2* | 7/2020 | Li | H04W 72/02 |
| 2015/0208332 | A1 | 7/2015 | Baghel et al. | |
| 2016/0174175 | A1* | 6/2016 | Adachi | H04W 56/001 370/350 |
| 2017/0295567 | A1* | 10/2017 | Chen | H04W 76/11 |
| 2022/0046605 | A1* | 2/2022 | Ohara | H04W 4/40 |

FOREIGN PATENT DOCUMENTS

| JP | 2017-503455 A | 1/2017 |
| WO | 2015/112259 A1 | 7/2015 |

OTHER PUBLICATIONS

Notice of Reasons for Refusal issued in Japanese Application No. 2020-547778 dated Dec. 6, 2022 (6 pages).
ZTE, "Discussion on NR Sidelink Physical layer structures", 3GPP TSG RAN WG1 Meeting #94, R1-1808603, Gothenburg, Sweden, Aug. 20-24, 2018 (4 pages).

(Continued)

*Primary Examiner* — Raj Jain
(74) *Attorney, Agent, or Firm* — Osha Bergman Watanabe & Burton LLP

(57) ABSTRACT

A user apparatus includes a reception unit configured to receive information indicating resources used for downlink or uplink from a base station apparatus and a transmission unit configured to transmit TDD configuration information used for determining an arrangement of resources used for sidelink.

5 Claims, 9 Drawing Sheets

(56) References Cited

OTHER PUBLICATIONS

Ericsson, "Configuration and signalling principles for NR sidelink", 3GPP TSG-RAN WG1 Meeting #94, R1-1809485, Goteborg, Sweden, Aug. 20-24, 2018 (4 pages).
Extended European Search Report issued in counterpart European Patent Application No. 18935801.3, dated Apr. 8, 2022 (9 pages).
ZTE; "Considerations on multi-carrier/PLMN operation and resource allocation"; 3GPP TSG RAN WG2 #92, R2-156608; Anaheim, USA; Nov. 16-20, 2015 (4 pages).
Panasonic; "Multiple SA transmissions during one SC period"; 3GPP TSG RAN WG2 Meeting #91, R2-153259; Beijing, China; Aug. 24-28, 2015 (3 pages).
International Search Report issued in Application No. PCT/JP2018/036151, dated Dec. 4, 2018 (5 pages).
Written Opinion issued in International Application No. PCT/JP2018/036151, dated Dec. 4, 2018 (4 pages).
3GPP TS 36.211 V15.2.0, Release 15; "3rd Generation Partnership Project; Technical Specification Group Radio Access Network; Evolved Universal Terrestrial Radio Access (E-UTRA); Physical channels and modulation;" Jun. 2018; Sophia Antipolis Valbonne, France (236 pages).
3GPP TR 22.886 V15.1.0, Release 15; "3rd Generation Partnership Project; Technical Specification Group Services and System Aspects; Study on enhancement of 3GPP Support for 5G V2X Services;" Mar. 2017; Sophia Antipolis Valbonne, France (58 pages).
3GPP TSG RAN WG1 #86; R1-166720; "Coexistence of Uu and PC5 based V2V;" Samsung; Aug. 22-26, 2016; Gothenburg, Sweden (3 pages).
3GPP TSG RAN WG1 Meeting #80bis; R1-151874; "Sidelink signalling design for Rel-13 discovery;" Huawei, HiSilicon; Apr. 20-24, 2015; Belgrade, Serbia (10 pages).
3GPP TSG RAN WG1 Meeting #86; R1-166515; "Details of resource pool design for sidelink V2V communication;" Intel Corporation; Aug. 22-26, 2016; Gothenburg, Sweden (7 pages).
3GPP TSG RAN WG1 Meeting #88bis; R1-1704587; "Multiplexing of URLLC and eMBB traffic in UL;" CATT; Apr. 3-7, 2017; Spokane, USA (5 pages).
Office Action issued in counterpart Chinese Patent Application No. 201880097804.4 dated Jun. 29, 2023 (15 pages).

* cited by examiner

FIG.5

LTE TDD configuration (3GPP TS 36.331 V15.2.0 section 6.3.2)

TDD-Config

— The IE *TDD-Config* is used to specify the TDD specific physical channel configuration.

TDD-Config information element

```
-- ASN1START

TDD-Config ::=                      SEQUENCE {
    subframeAssignment                  ENUMERATED {
                                            sa0, sa1, sa2, sa3, sa4, sa5, sa6},
    specialSubframePatterns             ENUMERATED {
                                            ssp0, ssp1, ssp2, ssp3, ssp4, ssp5, ssp6, ssp7,
                                            ssp8}
}

TDD-Config-v1130 ::=                SEQUENCE {
    specialSubframePatterns-v1130       ENUMERATED {ssp7, ssp9}
}

TDD-Config-v1430 ::=                SEQUENCE {
    specialSubframePatterns-v1430       ENUMERATED {ssp10}
}

TDD-Config-v1450 ::=                SEQUENCE {
    specialSubframePatterns-v1450       ENUMERATED {ssp10-CRS-LessDwPTS}
}

TDD-ConfigSL-r12 ::=                SEQUENCE {
    subframeAssignmentSL-r12            ENUMERATED {
                                            none, sa0, sa1, sa2, sa3, sa4, sa5, sa6}
}

SubframeAssignment-r15 ::=          ENUMERATED {sa0, sa1, sa2, sa3, sa4, sa5, sa6}

-- ASN1STOP
```

FIG.6

NR TDD configuration (3GPP TS 38.331 V15.2.0 section 6.3.2)

TDD-UL-DL-Config

The *TDD-UL-DL-Config* IEs determines the Uplink/Downlink TDD configuration. There are both, UE- and cell specific IEs.

*TDD-UL-DL-Config* information element

```
-- ASN1START
-- TAG-TDD-UL-DL-CONFIG-START

TDD-UL-DL-ConfigCommon ::=         SEQUENCE {
    referenceSubcarrierSpacing         SubcarrierSpacing,
    pattern1                           TDD-UL-DL-Pattern,
    pattern2                           TDD-UL-DL-Pattern,                    OPTIONAL,    -- Need R
    ...
}

TDD-UL-DL-Pattern ::=              SEQUENCE {
    dl-UL-TransmissionPeriodicity      ENUMERATED {ms0p5, ms0p625, ms1, ms1p25, ms2, ms2p5, ms5, ms10},
    nrofDownlinkSlots                  INTEGER (0..maxNrofSlots),
    nrofDownlinkSymbols                INTEGER (0..maxNrofSymbols-1),
    nrofUplinkSlots                    INTEGER (0..maxNrofSlots),
    nrofUplinkSymbols                  INTEGER (0..maxNrofSymbols-1),
    ...
}

TDD-UL-DL-ConfigDedicated ::=      SEQUENCE {
    slotSpecificConfigurationsToAddModList    SEQUENCE (SIZE (1..maxNrofSlots)) OF TDD-UL-DL-SlotConfig    OPTIONAL,    -- Need N
    slotSpecificConfigurationsToreleaseList   SEQUENCE (SIZE (1..maxNrofSlots)) OF TDD-UL-DL-SlotIndex     OPTIONAL,    -- Need N
    ...
}

TDD-UL-DL-SlotConfig ::=           SEQUENCE {
    slotIndex                          TDD-UL-DL-SlotIndex,
    symbols                            CHOICE {
        allDownlink                        NULL,
        allUplink                          NULL,
        explicit                           SEQUENCE {
            nrofDownlinkSymbols                INTEGER (1..maxNrofSymbols-1)      OPTIONAL,
            nrofUplinkSymbols                  INTEGER (1..maxNrofSymbols-1)      OPTIONAL
        }
    }
}

TDD-UL-DL-SlotIndex ::=            INTEGER (0..maxNrofSlots-1)

-- TAG-TDD-UL-DL-CONFIG-STOP
-- ASN1STOP
```

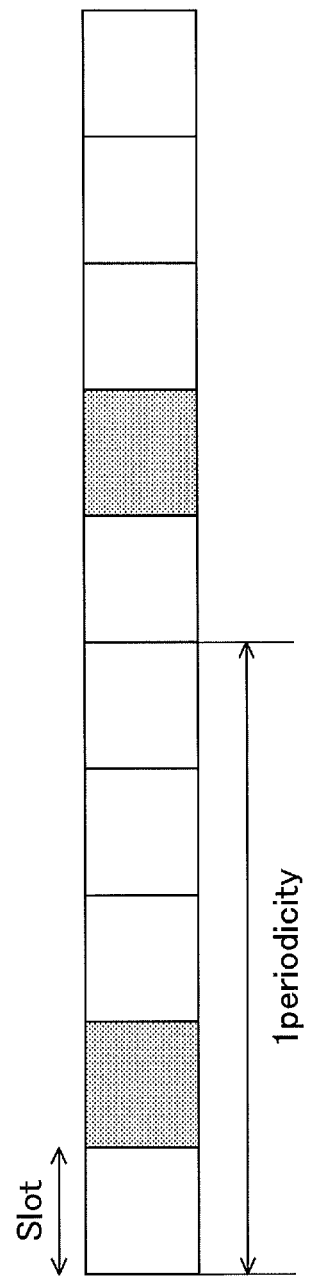

USER APPARATUS

BACKGROUND OF THE INVENTION

1. Field of the Invention

The present invention relates to a user apparatus in a wireless communication system.

2. Description of the Related Art

In LTE (Long Term Evolution) and LTE successor systems (e.g., LTE-A (LTE Advanced), NR (New Radio) (also referred to as 5G)), D2D (Device to Device) technology in which user apparatuses communicate directly without using base station apparatuses has been studied (e.g., Non-Patent Document 1).

The D2D reduces traffic between the user apparatus and the base station apparatuses and enables communication between the user apparatus even when the base station apparatus becomes unable to communicate in the event of a disaster, etc. In the 3GPP (3rd Generation Partnership Project), D2D is referred to as "sidelink", but the more general term D2D is used herein. However, the term "sidelink" is also used in the description of the embodiments described below, if necessary.

D2D communication is broadly divided into D2D discovery (also called D2D "hakken" in Japanese) for discovering other user apparatuses capable of communicating, and D2D communication (also called D2D direct communication, D2D "tsu-shin" in Japanese, direct communication between terminals, etc.) for communicating directly between user apparatuses. Hereinafter, when D2D communication, D2D discovery, etc. are not distinguished in particular, they are simply referred to as D2D. The signal transmitted and received by D2D is called a D2D signal. Various use cases of V2X (Vehicle to Everything) services in NR have been discussed (e.g. Non-Patent Document 2).

CITATION LIST

Non-Patent Document

[Non-patent Document 1] 3GPP TS 36.211 V15.2.0 (2018-06)
[Non-patent Document 2] 3GPP TR 22.886 V15.1.0 (2017-03)

SUMMARY OF THE INVENTION

Technical Problem

In V2X in LTE, SLSS (sidelink synchronization signal) and PSBCH (sidelink PBCH, broadcast information) are transmitted by the UE, and the UE can be a synchronization source.

In addition, in PSBCH of LTE, an indication of TDD configuration is transmitted in order to determine the resource allocation for the sidelink (resource allocation for SL).

In NR that can flexibly set TDD configuration compared to LTE, a large number of bits are required for the indication. Therefore, there is concern that the resource overhead, etc. will increase in order for the user apparatus to transmit an indication of TDD configuration in PSBCH.

The present invention has been made in view of the above, and is intended to enable the arrangement of appropriate SL transmission resources with a small amount of resource overhead.

Solution to Problem

According to the disclosed technique, a user apparatus is provided having a reception unit configured to receive information indicating resources used for downlink or uplink from a base station apparatus and a transmission unit configured to transmit TDD configuration information used for determining an arrangement of resources used for sidelink.

Advantageous Effects of Invention

The disclosed technique enables an arrangement of appropriate SL transmission resources with a small resource overhead.

BRIEF DESCRIPTION OF THE DRAWINGS

FIG. 5 is a drawing illustrating an information element for TDD configuration indication in an LTE.
FIG. 6 is a drawing illustrating an information element for TDD configuration indication in NR.
FIG. 7 is a drawing illustrating an example of a method for indicating a TDD configuration in an embodiment of the present invention.

DETAILED DESCRIPTION OF THE PREFERRED EMBODIMENTS

Embodiments of the present invention will now be described with reference to the drawings. It should be noted that the embodiments described below are exemplary, and the embodiments to which the present invention is applied are not limited to the following embodiments.

In the operation of the wireless communication system of an embodiment of the present invention, existing techniques are optionally used. However, the existing technology is, for example, an existing LTE, but is not limited to an existing LTE. Also, the term "LTE" as used herein, unless otherwise stated, shall have a broad meaning that includes LTE-Advanced and LTE-Advanced or later (e.g., NR) or a wireless LAN (local area network).

In an embodiment of the present invention, the duplex method may be a TDD (Time Division Duplex) method, FDD (Frequency Division Duplex) method, or any other method (e.g., Flexible Duplex, etc.).

Also, in an embodiment of the present invention, the term "configure" may mean that a predetermined value is pre-configured, or a radio parameter transmitted from a base station apparatus or a user apparatus is set.

Figure 1:
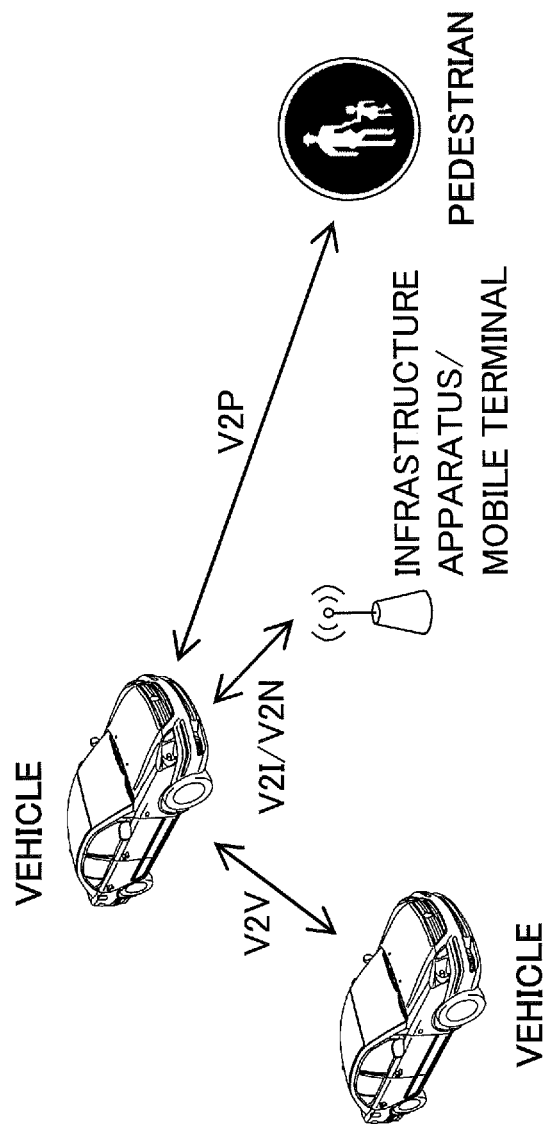
FIG. 1 is a drawing illustrating V2X.

FIG. 1 is a drawing for explaining V2X. In the 3GPP, realization of V2X (Vehicle to Everything) or eV2X (Enhanced V2X) by extending the D2D function has been discussed, and the specifications are being developed. As shown in FIG. 1, V2X is a generic term for V2V (Vehicle to Vehicle), which is a part of the Intelligent Transport Systems (ITS), which means a form of communication between vehicles and roadside units (RSU: Road-Side Unit), V2N (Vehicle to Nomadic device), which means a form of communication between vehicles and mobile devices owned by drivers, and V2P (Vehicle to Pedestrian), which means a form of communication between vehicles and mobile devices owned by pedestrians.

In addition, V2X using cellular communication and device-to-device communication of LTE or NR has been discussed in 3GPP. It is expected that the V2X of LTE or NR will be developed not only in the 3GPP specification but also in other specifications in the future. For example, it is expected that the following methods will be considered: ensuring interoperability, reducing costs by implementing the upper layer, combining or switching multiple RATS (Radio Access Technology), supporting regulations in each country, and acquiring, distributing, managing and using data on the LTE or NR V2X platform.

While in embodiments of the present invention it is expected that the communication device is mainly mounted on a vehicle, embodiments of the present invention are not limited to such embodiments. For example, the communication device may be a human-held terminal, a communication device may be a drone or airborne device, or the communication device may be a base station, an RSU, a relay node, a user apparatus having scheduling capability, or the like.

The SL (Sidelink) may be distinguished from UL (Uplink) or DL (Downlink) according to the following 1)-4) or a combination thereof. The SL may also be another name.

1) Resource arrangement in the time domain
2) Resource arrangement in the frequency domain
3) Referenced synchronization signal (including SLSS (Sidelink Synchronization Signal))
4) Reference signal used for path loss measurement for transmission power control It should be noted that slots in embodiments of the present invention may be read as mini-slots, subframes, radio frames, and TTIs (Transmission Time Interval). Cells in embodiments of the present invention may also be read as cell groups, carrier components, BWP, resource pools, resources, RAT (including Radio Access Technology), systems (including wireless LANs), and the like.

Figure 2:
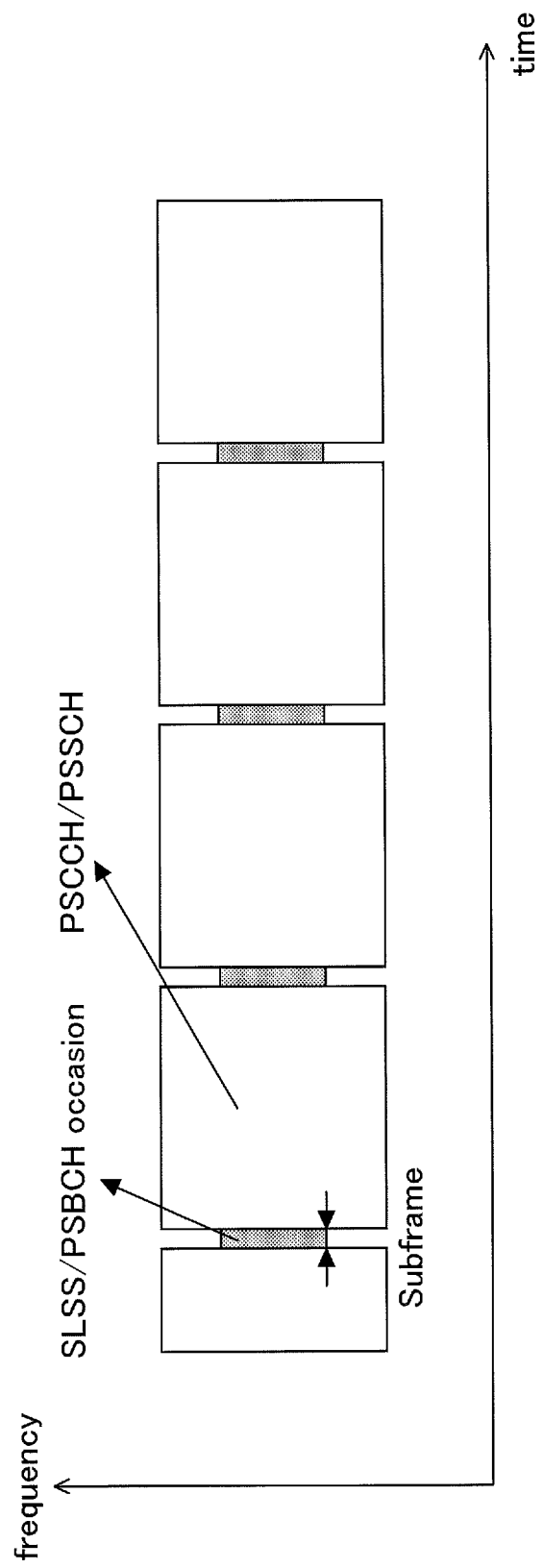
FIG. 2 is a drawing illustrating an example of an arrangement of synchronization signals and broadcast information for side link.

FIG. 2 is a drawing for explaining an example of an arrangement of a synchronization signal and broadcast information of sidelink. In LTE V2X, PSBCH (Physical Sidelink Broadcast Channel), via which SLSS (Sidelink synchronization signal) that is a synchronization signal and broadcast information are transmitted, is transmitted by a user apparatus, and other user apparatuses can use the user apparatus transmitting the SLSS as a synchronization source.

As shown in FIG. 2, the SLSS and PSBCH transmission opportunities (SLSS/PSBCH occasion) in LTE V2X occupy the entire subframe (Subframe). PSCCH (Physical Sidelink Control Channel) or PSSCH (Physical Sidelink Shared Channel) is not multiplexed in the time domain with the transmission opportunities of SLSS and PSBCH.

In NR V2X, it is considered that a signal related to side-link synchronization processing includes SLSS and PSBCH. The synchronization source may be, for example, GNSS (Global Navigation Satellite System), gNB (Next Generation Node-B), eNB (Enhanced Node-B), NR-UE (User Equipment), or LTE-UE.

The signal including SLSS and PSBCH may be referred to as SL SS block, SL SS/PBCH block, SL SS/PSBCH block, etc. It is commonly referred to as SL SSB in this specification. The SL SSB may also contain DM RS, etc.

Figure 3:
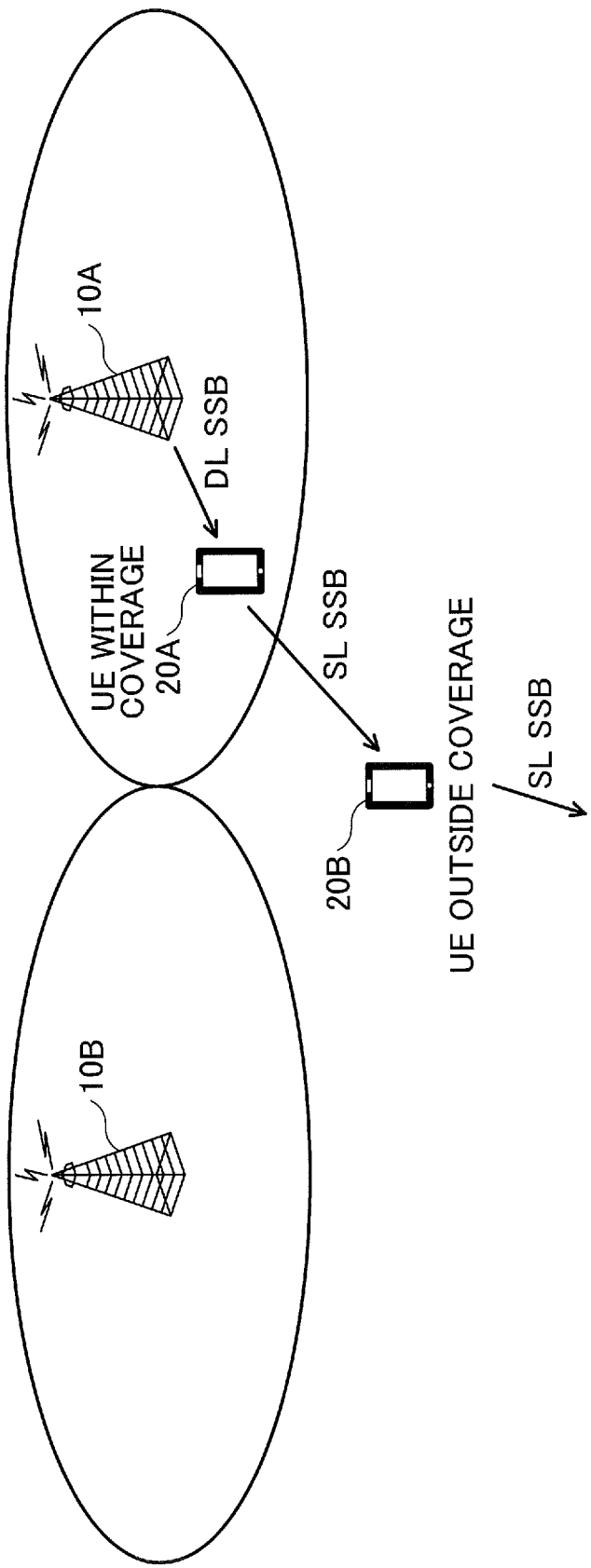
FIG. 3 is a drawing illustrating an example of a radio communication system according to an embodiment of the present invention.

FIG. 3 is a drawing illustrating an example of a radio communication system according to an embodiment of the present invention. In NR V2X, the amount of resources required to transmit SL-SSB may be large. Thus, for example, a user apparatus 20A may transmit an SL-SSB using the resources of a channel already arranged in DL or UL. By using the resources of a channel already arranged in DL or UL, the user apparatus 20A can transmit SL-SSB without newly obtaining the resources dedicated to SL-SSB.

As shown in FIG. 3, the user apparatus 20A located within the coverage of base station apparatus 10A receives DL-SSB from the base station apparatus 10A. The user apparatus 20A transmits SL-SSB to a user apparatus 20B located outside the coverage. Further, the user apparatus 20B may transmit SL-SSB to other user apparatuses 20B located outside the coverage.

Figure 4:
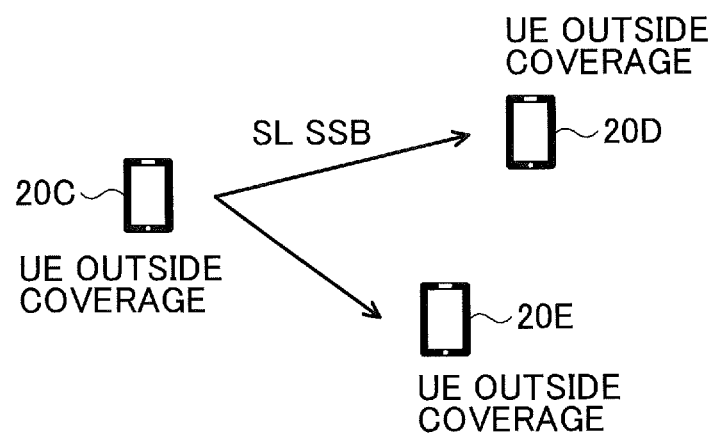
FIG. 4 illustrates another example of a radio communication system in an embodiment of the present invention.

FIG. 4 is a drawing illustrating another example of a radio communication system according to an embodiment of the present invention. In the example illustrated in FIG. 4, pre-set SL-SSB resource information is stored in the memory or SIM of a user apparatus 20C located outside the coverage. The user apparatus 20C transmits the SL-SSB to other user apparatuses 20D, 20E located outside the coverage based on the pre-set SL-SSB resource information, etc.

FIG. 5 is a drawing illustrating an information element for an indication of TDD configuration in LTE. The parameter TDD-ConfigSL in the Information Element TDD-Config is a parameter used to indicate the TDD Configuration for the sidelink, and the values sa0 to sa6 set to the parameter TDD-ConfigSL indicate the patterns of TDD Configuration. It can be seen that in LTE, the number of TDD configuration patterns is limited and can be indicated with relatively few bits.

FIG. 6 is a drawing illustrating an information element for TDD configuration indication in NR. As shown in FIG. 6, the information elements TDD-UL-DL-ConfigCommon and TDD-UL-DL-ConfigDedicated are included in the information element TDD-UL-DL-Config, and various parameters can be used for the configuration.

For example, TDD-UL-DL-ConfigCommon, which is TDD configuration common information, includes sub-carrier spacing and configuration pattern information of DL-UL. The pattern information includes periodic information of the DL-UL pattern, and information for setting the number of DL slots in the DL-UL pattern, the number of DL symbols, the number of UL slots, the number of UL symbols, and the like. In addition, two different pattern information sets can be set, and they are arranged continuously. In addition, the TDD-UL-DL-ConfigDedicated can set the DL-UL pattern in each slot in more detail than the TDD-UL-DL-ConfigCommon.

Accordingly, there is concern that the number of bits required to indicate the TDD configuration is larger in NR than in LTE, and that the resource overhead, etc. is larger in order for the user apparatus to indicate the TDD configuration in PSBCH.

To resolve these concerns, the following method is used to enable the arrangement of appropriate SL transition resources (arrangement of SL transmission resources) with little resource overhead.

(Method 1)

One way of enabling the arrangement of appropriate SL transmission resources with a small resource overhead is to indicate only TDD-UL-DL-ConfigCommon. In Method 1, TDD-UL-DL-ConfigDedicated does not need to be indicated (transmitted).

(Method 1-1)

As Method 1-1, it is considered that all information contained in the TDD-UL-DL-ConfigCommon (including periodic information of the DL-UL pattern, the number of DL slots in the DL-UL pattern, the number of DL symbols, the number of UL slots, the number of UL symbols, etc.) is indicated.

(Method 1-2)

As Method 1-2, it is considered that some of the TDD-UL-DL-ConfigCommon information is indicated.

As a method for indicating some of the information, for example, only information about Periodicity (periodic information), UplinkSlot (number of UL slots), and UplinkSymbol (number of UL symbols) may be indicated in the TDD-UL-DL-ConfigCommon.

As shown in FIG. 6, the information element TDD-UL-DL-Config can indicate two patterns (pattern1, pattern2) as a configuration pattern. When indicating information about Periodicity, UplinkSlot, or UplinkSymbol, both pattern1 and pattern2 may be indicated, or pattern1 or pattern2 may be indicated.

As a method for indicating some of the information, for example, only information about Periodicity, Downlink Slot, and Downlink Symbol in TDD-UL-DL-ConfigCommon may be indicated.

When indicating information about Periodicity, Downlink Slot, or Downlink Symbol, both pattern1 and pattern2 may be indicated, or pattern1 or pattern2 may be indicated.

As a method for indicating some of the information, for example, instead of indicating the periodicity of each of the two consecutive patterns (pattern1 and pattern2), each Periodicity may be added together to indicate information about the UplinkSlot and UplinkSymbol of pattern2.

As a method for indicating some of the information, for example, instead of indicating the periodicity of each of the two consecutive patterns (pattern1 and pattern2), each Periodicity may be added together to be indicated, and information about the Downlink Slot and Downlink Symbol of pattern2 may be indicated.

As a method of indicating some of the information, for example, instead of indicating the respective periodicity of two consecutive patterns (pattern1 and pattern2), the aggregated periodicity of each Periodicity may be indicated and some of the information of pattern1 or pattern2 may be indicated.

(Method 2)

As a method 2 of enabling the arrangement of the appropriate SL transmission resource with a small resource overhead, it is possible to indicate the periodicity of the TDD-UL-DL-ConfigCommon and indicate an offset corresponding to the periodicity as an indication of the arrangement of the SL transmission resource.

FIG. 7 is a drawing illustrating an example of the method 2 for indicating TDD configuration in an embodiment of the present invention.

In the example shown in FIG. 7, the periodicity of the indicated TDD configuration corresponds to five slots. The offset indicating slot #1, which is the second slot among the five slots #0 to #4, is indicated (transmitted).

The indicated offset may include a slot offset and a symbol offset, or may include either a slot offset or a symbol offset.

Resources for SL transmission may include resources for one or more of an SL SS, a PSBCH, an SL SSB, a PSCCH, a PSSCH, or other SL channels.

The periodicity information of the TDD-UL-DL-ConfigCommon to be indicated may include both of, or one of the periodicity of pattern1 and the periodicity of pattern2.

(Method 3)

As a method 3 that enables the arrangement of appropriate SL transmission resources with a small resource overhead, it is possible to indicate or specify a candidate position of the SL resource and to indicate or specify the configuration (configuration, setting) of DL/X (flexible)/UL at the resource candidate position.

For example, the slot position of the SL resource is indicated or specified, and the configuration (configuration, setting) of DL/X (flexible)/UL at the slot position is indicated or specified. For the indication or specification of DL/X(flexible)/UL configuration at the slot position, at least one of the number of DL symbols and the number of UL symbols may be indicated or specified, or the configuration pattern of DL/X(flexible)/UL may be indicated or specified by SlotFormatIndicator (SFI). The slot position as indicated or defined may be one slot or a plurality of consecutive slots.

(Method 4)

It is considered that the location of the actually transmitted DL SSB is indicated as a method 4 that enables the arrangement of the appropriate SL transmission resource with a small resource overhead.

The method of indicating the location of the actually transmitted DL SSB may be indicated using the slot offset and periodicity of the SSB group, or it may be indicated using the transmitted SSB bitmap in the SSB group, or it may be indicated using SSB subcarrier spacing or the like. Alternatively, similar information may be indicated by the SL based on the actually transmitted DL SSB indication obtained from the DL broadcast information.

(Method 5)

As a method 5 that enables the arrangement of the appropriate SL transmission resource with a small resource overhead, it is considered that the user apparatus 20 indicates identifiable information, such as a position or an SSB index, of the SSB that was received (detected) by the user apparatus 20 or of the SSB that met a predetermined threshold value.

The SSB may be one SSB or more SSBs. The SSB may be indicated, for example, in the form of a bitmap.

For the predetermined threshold, the strength or quality threshold of the measured SSB may be used. For example, thresholds based on RSRP, RSRQ, SINR, and the like may be used. The predetermined threshold value may be a threshold value based on the value measured by L1 (Layer 1) or a threshold value based on the measurement result value filtered by L3 (Layer 3). The predetermined threshold may be applied to a measured result per beam or to a measured result per cell.

The predetermined threshold may be indicated to the user apparatus 20, or may be predefined.

In the arrangement of the SL transmission resource, any one or more of the matters in (1) to (5) below may be applied to the allocation of DL, X, UL, and SSB determined by the method 1 to 5 above.

(1) SL transmission resources overlapping an area other than UL may be excluded from the resource for SL transmission.
(2) SL transmission resources overlapping areas other than X may be excluded from the SL transmission resources.
(3) SL transmission resources overlapping areas other than X and UL may be excluded from the SL transmission resources.
(4) SL transmission resources overlapping the symbols of the actually transmitted SSB (transmitted SSB, actually transmitted SSB) may be excluded from the SL transmission resource.
(5) SL transmission resources overlapping an area other than the actually transmitted SSB symbol may be excluded from the SL transmission resource.

Information indicating the arrangement of the SL transmission resource may be applied as information to areas other than the excluded areas (i.e., areas that were not excluded) as a result of the application of one or more of the above items (1) to (5).

For example, when a slot offset, a symbol offset, etc. are indicated or specified as information indicating the arrangement of the SL transmission resource, such a slot offset, symbol offset, etc. may be applied as an offset to areas other than the excluded areas as a result of the application of one or more of the above items (1) to (5).

As a specific example, in FIG. 7, slot #3 and slot #4 in the five slots #0 to #4 are UL and the above (1) is applied.

As a result of the application of the above (1), the offset indicating the second slot is applied to the area in which the area other than the UL is excluded (slot #3 and slot #4), so the second slot in slot #3 and slot #4 (i.e., slot #4) becomes the resource for SL transmission.

In an embodiment of the present invention, the SL transmission may be any one or more of SL SS, PSBCH, SL SSB, PSCCH, PSSCH, or other SL channels.

In an embodiment of the present invention, all signaling for indication or specification may be either RRC, MAC, DCI (Downlink Control Information) or SCI (Sidelink Control Information). The signaling may also be transmitted via any of the channels PBCH, PDCCH, PDSCH, PSBCH, PSDCH, PSSCH, or PSCCH. That is, the user apparatus 20 may receive signaling from the base station apparatus 10, or the user apparatus 20 may receive signaling from other user apparatuses 20. The signaling may also be pre-configured. For example, the signaling may be based on information previously written to the SIM card or terminal, or it may be based on information that holds what has been previously indicated.

(Apparatus Configuration)

Next, examples of functional structures of the base station apparatus 10 and the user apparatus 20 that perform the processes and operations described above will be described. The base station apparatus 10 and the user apparatus 20 each have functions for performing an embodiment of the present invention. It should be noted that the base station apparatus 10 and the user apparatus 20 each may have only a part of the functions for performing an embodiment of the present invention.

<Base Station Apparatus 10>

Figure 8:
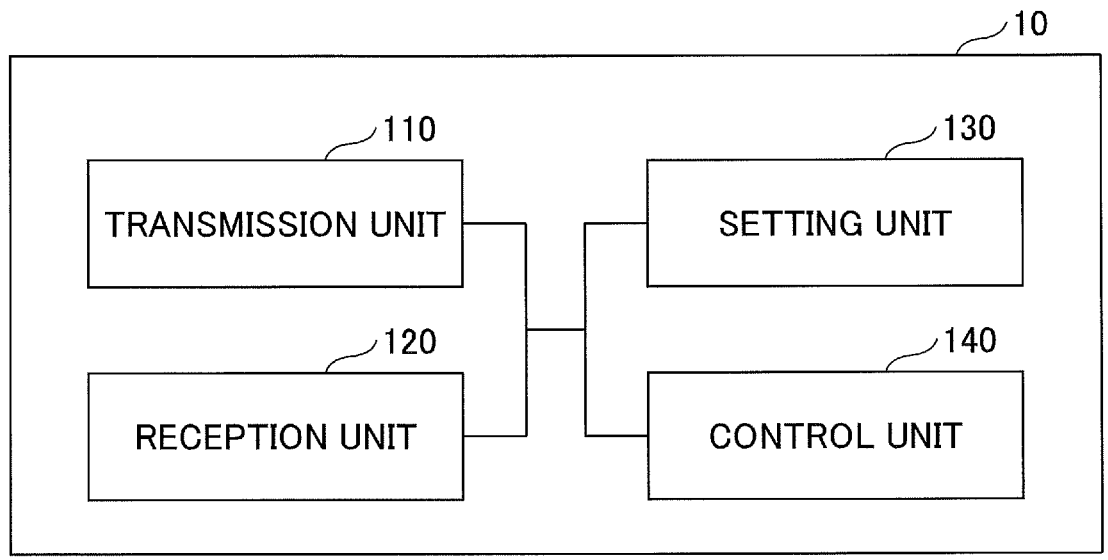
FIG. 8 is a drawing illustrating an example of a functional configuration of a base station apparatus 10 according to an embodiment of the present invention.

FIG. 8 is a drawing illustrating an example of a functional structure of a base station apparatus 10. As illustrated in FIG. 8, the base station apparatus 10 includes a transmission unit 110, a reception unit 120, a configuration unit (setting unit) 130, and a control unit 140. The functional structure illustrated in FIG. 8 is merely an example. Functional divisions and names of functional units may be anything as long as operations according to an embodiment of the present invention can be performed.

The transmission unit 110 has a function for generating a signal to be transmitted to the user apparatus 20 and for transmitting the signal wirelessly. The reception unit 120 has a function for receiving various signals transmitted from the user apparatus 20 and for obtaining, for example, upper layer information from the received signals.

The setting unit 130 stores, in a storage apparatus, pre-configured configuration information and various configuration information items to be transmitted to the user apparatus 20, and reads them from the storage apparatus if necessary. Contents of the configuration information are, for example, information related to configuration of D2D communication, etc.

The control unit 140 performs processing related to configuration used for D2D communication performed by the user apparatus 20, as described in an embodiment of the present invention. Further, the control unit 140 performs processing pertaining to determination of resources used for synchronization signals and broadcast information for D2D communications. Further, the control unit 140 transmits scheduling of D2D communication to the user apparatus 20 via the transmission unit 110. The functional units related to signal transmission in the control unit 140 may be included in the transmission unit 110, and the functional units related to signal reception in the control unit 140 may be included in the reception unit 120.

<User Apparatus 20>

Figure 9:
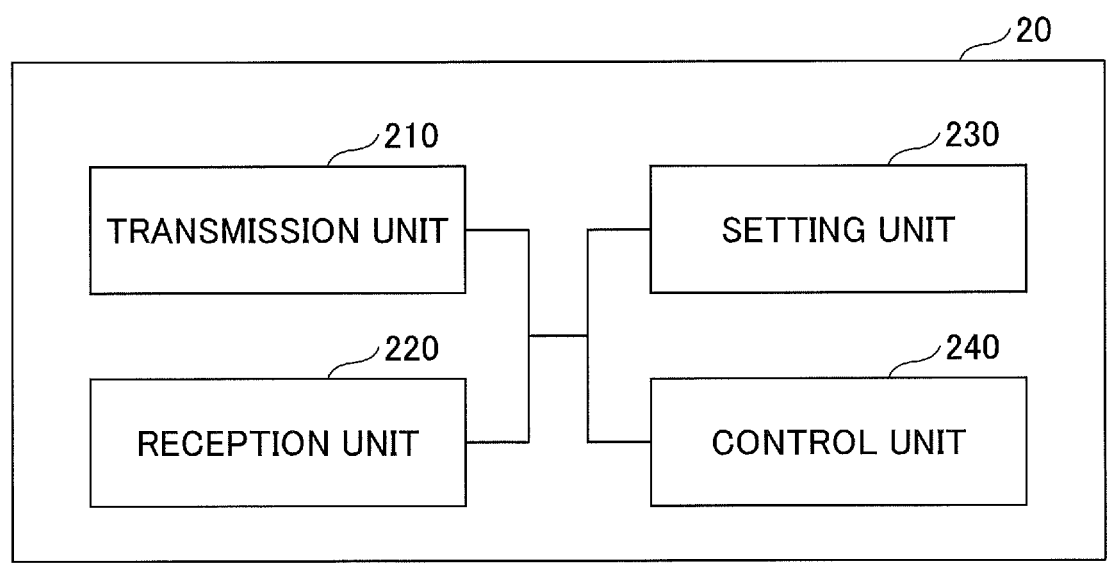
FIG. 9 is a drawing illustrating an example of a functional configuration of a user apparatus 20 according to an embodiment of the present invention.

FIG. 9 is a drawing illustrating an example of a functional structure of a user apparatus 20. As illustrated in FIG. 9, the user apparatus 20 includes a transmission unit 210, a reception unit 220, a setting unit 230, and a control unit 240. The functional structure illustrated in FIG. 9 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, for example, with respect to the D2D communications, the transmission unit transmits, to another user apparatus 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the other user apparatus 20, PSCCH, PSSCH, PSDCH, or PSBCH.

The setting unit 230 stores, in a storage apparatus, various configuration information items received from the base station apparatus 10 or the user apparatus 20 via the reception unit 220, and reads them from the storage apparatus if necessary. Further, the configuration (setting) unit 230 also stores preset configuration (setting) information. Contents of the configuration information are, for example, information related to configuration of D2D communication, etc.

The control unit 240 controls D2D communication with another user apparatus 20 as described in an embodiment of the present invention. Further, the control unit 240 performs processing pertaining to determination of resources used for synchronization signals and broadcast information for D2D communications. Further, the control unit 240 may perform scheduling for D2D communications. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 8 and FIG. 9), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 10:
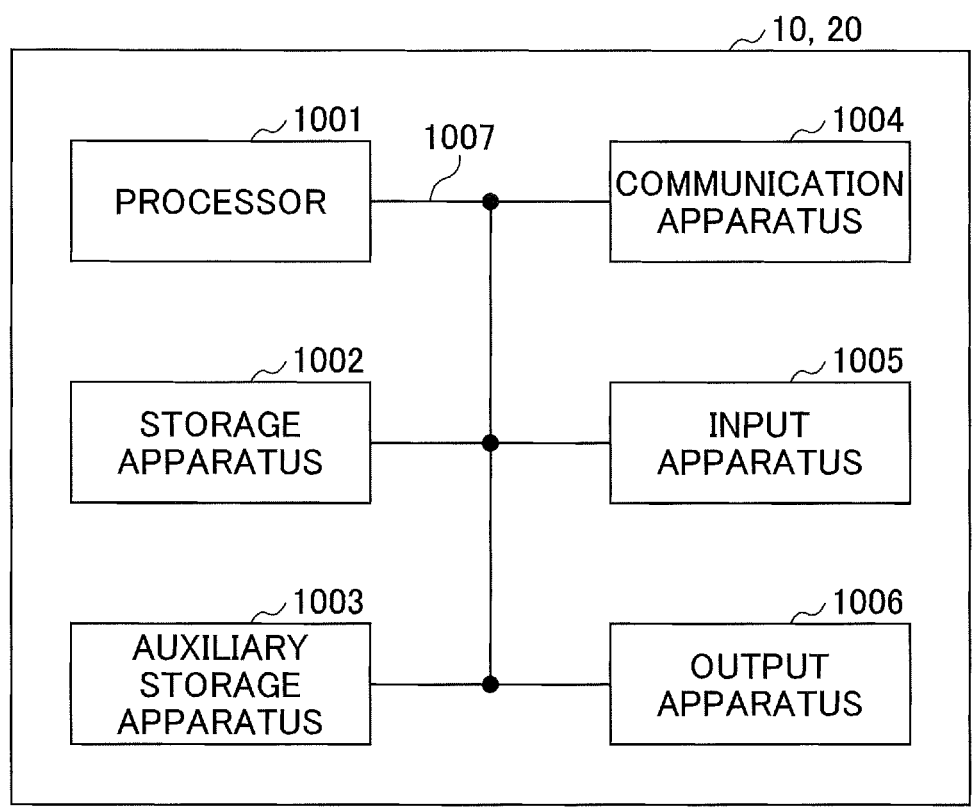
FIG. 10 is a drawing illustrating an example of a hardware configuration of a base station apparatus 10 or a user apparatus 20 according to an embodiment of the present invention.

For example, the base station apparatus 10, the user apparatus 20, or the like according to an embodiment of the present invention may function as a computer for processing the radio communication method illustrated by an embodiment of the present invention. FIG. 10 is a drawing illustrating an example of hardware structures of a base station apparatus 10 and a user apparatus 20 according to an embodiment the present invention. Each of the base station apparatus 10 and the user apparatus 20 may be physically a computer apparatus including a processor 1001, a storage apparatus 1002, an auxiliary storage apparatus 1003, a communication apparatus 1004, an input apparatus 1005, an output apparatus 1006, a bus 1007, etc.

It should be noted that, in the descriptions below, the term "apparatus" can be read as a circuit, a device, a unit, etc. The hardware structures of the base station apparatus 10 and the user apparatus 20 may include one or more of each of the apparatuses illustrated in the figure, or may not include some apparatuses.

Each function in the base station apparatus 10 and the user apparatus 20 is realized by having the processor 1001 perform an operation by reading predetermined software (programs) onto hardware such as the processor 1001 and the storage apparatus 1002, and by controlling communication by the communication apparatus 1004 and controlling at least one of reading and writing of data in the storage apparatus 1002 and the auxiliary storage apparatus 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads a program (program code), a software module, or data from the auxiliary storage apparatus 1003 and/or the communication apparatus 1004, and performs various processes according to the program, the software module, or the data. As the program, a program is used that causes the computer to perform at least a part of operations according to an embodiment of the present invention described above. For example, the control unit 140 of the base station apparatus 10 illustrated in FIG. 8 may be realized by control programs that are stored in the storage apparatus 1002 and are executed by the processor 1001. Further, for example, the control unit 240 of the user apparatus 20 illustrated in FIG. 9 may be realized by control programs that are stored in the storage apparatus 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is capable of storing programs (program codes), software modules, or the like, that are executable for performing communication processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The auxiliary storage apparatus 1003 may be referred to as an auxiliary storage apparatus. The above recording medium may be a database including the storage apparatus 1002 and/or the auxiliary storage apparatus 1003, a server, or any other appropriate medium.

The communication apparatus 1004 is hardware (transmission and reception device) for communicating with computers via at least one of a wired network and a wireless network, and may be referred to as a network device, a network controller, a network card, a communication module, etc. The communication apparatus 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication apparatus 1004. The transmitting/receiving unit may be physically or logically divided into a transmitting unit and a receiving unit.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station apparatus 10 and the user apparatus 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, provided is a user apparatus that includes a reception unit configured to receive information indicating resources used for downlink or uplink from a base station apparatus; and a transmission unit configured to indicate TDD configuration information used for determining an arrangement of resources used for sidelink.

According to the above-described arrangement, the user apparatus 20 can perform appropriate SL resource arrangement with little resource overhead.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment the present invention may be changed as long as there is no contradiction. For the sake of description convenience, a base station apparatus 10 and a user apparatus 20 have been described by using functional block diagrams. However, the apparatuses may be realized by hardware, software, or a combination of hardware and software. The software executed a processor included in a base station apparatus 10 according to an embodiment of the present invention and the software executed by a processor included in a user apparatus 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 10 in the present specification, may be performed by an upper node in some cases. In a network including one or more network nodes including a base station apparatus 10, it is apparent that various operations performed for communicating with a user apparatus 20 may be performed by the base station apparatus 10 and/or another network node other than the base station apparatus 10 (for example, but not limited to, MME or S-GW). According to the above, a case is described in which there is a single network node other than the base station apparatus 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple user apparatuses 20 (e.g., may be referred to as D2D (Device-to-Device), V2X (Vehicle-to-Everything), etc.). In this case, the function of the base station apparatus 10 described above may be provided by the user apparatus 20. Further, the phrases "up" and "down" may also be replaced by the phrases corresponding to terminal-to-terminal communication (e.g., "side"). For example, an uplink channel, an downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each user apparatus 20 to allocate radio resources (such as frequency bandwidth, transmission power, etc. that can be used in each user apparatus 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

EXPLANATION OF SYMBOLS

10 Base station apparatus
110 Transmission unit
120 Reception unit
130 Setting unit
140 Control unit
20 User apparatus
210 Transmission unit
220 Reception unit
230 Setting unit
240 Control unit
1001 Processor
1002 Storage apparatus
1003 Auxiliary storage apparatus
1004 Communication apparatus
1005 Input apparatus
1006 Output apparatus

What is claimed is:

1. A terminal comprising:
a receiver configured to receive, from a base station, first configuration information related to resources used in a communication between the base station and the terminal or in a device-to-device communication;
a transmitter configured to transmit, to another terminal, second configuration information, included in the first configuration information, related to a resource used in the device-to-device communication; and
a processor configured not to include a slot for a synchronization signal for the device-to-device communication in the resource used in the device-to-device communication, and configured not to include a slot that is not for uplink in the resource used in the device-to-device communication.

2. The terminal according to claim 1, wherein the processor uses a configuration value related to the resource in the device-to-device communication, the configuration value being pre-configured to the terminal.

3. The terminal according to claim 1, wherein the second configuration information includes a first pattern with respect to information related to a periodicity, a slot, and a symbol, or the first pattern and a second pattern.

4. A communication system comprising: a base station; and a terminal, wherein
the base station includes
a transmitter of the base station configured to transmit, to the terminal, first configuration information related to resources used in a communication between the base station and the terminal or in a device-to-device communication, and
the terminal includes:
a receiver configured to receive the first configuration information from the base station;
a transmitter of the terminal configured to transmit, to another terminal, second configuration information, included in the first configuration information, related to a resource used in the device-to-device communication; and
a processor configured not to include a slot for a synchronization signal for the device-to-device communication in the resource used in the device-to-device communication, and configured not to include a slot that is not for uplink in the resource used in the device-to-device communication.

5. A communication method of a terminal, the method comprising:
receiving, from a base station, first configuration information related to resources used in a communication between the base station and the terminal or in a device-to-device communication;
transmitting, to another terminal, second configuration information, included in the first configuration information, related to a resource used in the device-to-device communication;
not including a slot for a synchronization signal for the device-to-device communication in the resource used in the device-to-device communication; and
not including a slot that is not for uplink in the resource used in the device-to-device communication.

* * * * *